(12) United States Patent
Thomasson

(10) Patent No.: US 9,670,332 B2
(45) Date of Patent: *Jun. 6, 2017

(54) ELASTOMERIC COMPOSITION EXHIBITING VERY GOOD DISPERSION OF THE FILLER IN THE ELASTOMERIC MATRIX

(75) Inventor: Damien Thomasson, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 579 days.

This patent is subject to a terminal disclaimer.

(21) Appl. No.: 13/994,192

(22) PCT Filed: Dec. 9, 2011

(86) PCT No.: PCT/EP2011/072290
§ 371 (c)(1),
(2), (4) Date: Jul. 29, 2013

(87) PCT Pub. No.: WO2012/080111
PCT Pub. Date: Jun. 21, 2012

(65) Prior Publication Data
US 2013/0303687 A1 Nov. 14, 2013

(30) Foreign Application Priority Data
Dec. 17, 2010 (FR) .................................... 10 60689

(51) Int. Cl.
*C08K 3/04* (2006.01)
*C08J 3/22* (2006.01)
*C08L 21/00* (2006.01)
*C08K 3/36* (2006.01)

(52) U.S. Cl.
CPC .................. *C08K 3/04* (2013.01); *C08J 3/226* (2013.01); *C08K 3/36* (2013.01); *C08L 21/00* (2013.01); *C08J 2421/00* (2013.01)

(58) Field of Classification Search
CPC ............... C08K 3/04; C08K 3/36; C08J 3/226
See application file for complete search history.

(56) References Cited

U.S. PATENT DOCUMENTS

| | | | |
|---|---|---|---|
| 3,700,621 A | 10/1972 | Burke, Jr. | |
| 5,693,712 A | 12/1997 | Urban et al. | |
| 5,977,238 A | 11/1999 | Labauze | |
| 6,013,718 A | 1/2000 | Cabioch et al. | |
| 6,040,364 A | 3/2000 | Mabry et al. | |
| 6,048,923 A | 4/2000 | Mabry et al. | |
| 6,075,084 A | 6/2000 | Mabry | |
| 6,211,271 B1 | 4/2001 | Garro et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 2001/0034389 A1 | 10/2001 | Vasseur | |
| 2002/0086917 A1 | 7/2002 | Chung et al. | |
| 2003/0212185 A1 | 11/2003 | Vasseur | |
| 2004/0051210 A1 | 3/2004 | Tardivat et al. | |
| 2004/0092648 A1 | 5/2004 | Jones | |
| 2004/0132880 A1 | 7/2004 | Durel et al. | |
| 2004/0167705 A1 | 8/2004 | Lingman et al. | |
| 2005/0016650 A1 | 1/2005 | Durel et al. | |
| 2005/0016651 A1 | 1/2005 | Durel et al. | |
| 2006/0079608 A1 | 4/2006 | Chung et al. | |
| 2006/0089445 A1 | 4/2006 | Gandon-Pain | |
| 2006/0111475 A1 | 5/2006 | Mabry et al. | |
| 2007/0112120 A1 | 5/2007 | Vasseur | |
| 2009/0018238 A1 | 1/2009 | Yanagisawa et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0308513 A1 | 12/2009 | Ota | |
| 2010/0048799 A1 | 2/2010 | Miyazaki et al. | |
| 2010/0184912 A1 | 7/2010 | Marechal et al. | |
| 2010/0249270 A1 | 9/2010 | Robert et al. | |
| 2010/0252156 A1 | 10/2010 | Robert et al. | |
| 2011/0152458 A1 | 6/2011 | Araujo Da Silva et al. | |
| 2012/0172492 A1* | 7/2012 | Wang .................... | B01F 5/0646 523/352 |
| 2012/0277344 A1 | 11/2012 | Wang et al. | |

FOREIGN PATENT DOCUMENTS

| | | |
|---|---|---|
| CA | 2773920 | 3/2011 |
| CN | 1222878 | 7/1999 |
| CN | 1352592 A | 6/2002 |
| CN | 101115785 | 1/2008 |
| CN | 101115785 A | 1/2008 |
| CN | 101654531 | 2/2010 |
| DE | 10024613 | 11/2000 |
| EP | 0018751 | 11/1983 |
| EP | 1127909 A1 | 8/2001 |
| EP | 1321488 B1 | 6/2006 |
| EP | 1873191 | 1/2008 |
| FR | 2740778 A1 | 5/1997 |
| FR | 2765882 A1 | 1/1999 |
| GB | 744509 A | 2/1956 |
| GB | 744509 A | 2/1956 |

(Continued)

OTHER PUBLICATIONS

International Search Report on Application PCT/EP2011/072287dated Mar. 3, 2012.

(Continued)

*Primary Examiner* — Peter D Mulcahy
(74) *Attorney, Agent, or Firm* — Dickinson Wright PLLC

(57) ABSTRACT

The invention relates to a rubber composition based on at least one diene elastomer, a filler comprising at least carbon black and an inorganic filler with an inorganic filler content of less than or equal to 50 parts by weight per hundred parts of elastomer, phr, and also a crosslinking system, characterized in that the dispersion of the filler in the elastomeric matrix has a Z value of greater than or equal to 80; and also to the process for preparing such a composition.

8 Claims, No Drawings

(56) References Cited

FOREIGN PATENT DOCUMENTS

| | | |
|---|---|---|
| JP | H07278357 A | 10/1995 |
| JP | 2000119450 A | 4/2000 |
| JP | 2000507892 A | 6/2000 |
| JP | 2002521516 A | 7/2002 |
| JP | 2006225598 A | 8/2006 |
| JP | 2006225606 A | 8/2006 |
| JP | 2007161818 | 6/2007 |
| JP | 2007224067 A | 9/2007 |
| JP | 2010013552 | 1/2010 |
| JP | 2010254905 A | 11/2010 |
| JP | 201157967 | 3/2011 |
| WO | 9736724 A2 | 10/1997 |
| WO | 0005301 A1 | 2/2000 |
| WO | WO 01/92402 A1 | 12/2001 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 2004/096865 A2 | 11/2004 |
| WO | WO 2006/125532 A1 | 11/2006 |
| WO | WO 2006/125533 A1 | 11/2006 |
| WO | WO 2006/125534 A1 | 11/2006 |
| WO | WO 2008/141702 A1 | 11/2008 |
| WO | WO 2009/000750 A1 | 12/2008 |
| WO | WO 2009/000752 A1 | 12/2008 |
| WO | 2011034585 | 3/2011 |

OTHER PUBLICATIONS

International Search Report on Application PCT/EP2012/075140 dated Feb. 20, 2013.
International Search Report on Application PCT/EP2012/071280 dated Feb. 20, 2013.
ASMT International "Standard Test Method for Carbon Black—Total and External Surface Area by Nitrogen Absorption", Designation: D6556-10, p. 086-1090.
Australian Office Action for corresponding application No. 2011344438 dated Feb. 10, 2015.
International Search Report (PCT/ISA/210) issued on Apr. 3, 2012, by the European Patent Office as the International Searching Authority for International Application No. PCT/EP2011/072290.
Chapter 3, "Latex concentrates: properties and composition" by KF. Gaseley, A.D.T. Gordon and T.D. Pendle in "Natural Rubber Science and Technology", A.D. Roberts, Oxford University Press—1988.
C.W. Carr, I.M. Kolthoff, E.J. Meehan and D.E. Williams, "Studies on Rate of Emulsion Polymerization of Butadiene-Styrene (75:25) as a Function of Amount and Kind of Emulsifier Used. II. Polymerization with Fatty Acid Soaps, Rosin Soaps, and Various Synthetic Emulsifiers", Journal of Polymer Science, vol. V. No. 2, pp. 201-206, Mar. 18, 1949.
I.M. Kolthoff, E.J. Meehan and C.W. Carr, "Studies on Rate of Emulsion Polymerization of Butadiene-Styrene (75:25) as a Function of Amount and Kind of Emulsifier Used. III. Effect of Amount of Soap on Rate of Polymerization Emulsifiers", Journal of Polymer Science, vol. VI. No. 1, pp. 73-37, Sep. 24, 1949.
E.J. Vandenbert and G.E. Hulse, Hercules Powder Company, Wilmington 99, Del "Cumene Hydroperoxide in Redox Emulsion Polymerization", Industrial and Engineering Chemistry, vol. 40, No. 5, pp. 932-937, May 1948.
J.R. Miller arid H.E. Diem, Akron Experimental Station, B.F. Goodrich Chemical Co., Akron, Ohio, "Superfast GR-S Polymerization at 41 Degrees F.", Industrial and Engineering Chemistry, vol. 46, No. 5, pp. 1065-1073, Feb. 5, 1954.

* cited by examiner

ELASTOMERIC COMPOSITION EXHIBITING VERY GOOD DISPERSION OF THE FILLER IN THE ELASTOMERIC MATRIX

BACKGROUND

1. Field

The invention relates to a rubber composition based on at least one diene elastomer, a filler comprising at least carbon black and an inorganic filler, in particular silica, this composition having a very good dispersion of filler in the elastomeric matrix. The invention relates more particularly to the preparation of such a composition based on at least one masterbatch comprising the diene elastomer and the carbon black, said masterbatch itself having a very good dispersion of the carbon black in the elastomeric matrix.

The term "masterbatch" is understood to mean: an elastomer-based composite into which a filler and optionally other additives have been introduced.

The present invention relates in particular to the use of such a masterbatch for the manufacture of diene rubber compositions reinforced with a blend of organic filler and inorganic filler, which are intended for the manufacture of tires or of semi-finished products for tires, in particular treads for these tires.

2. Description of Related Art

It is known that in order to obtain the optimum reinforcing properties and hysteresis properties imparted by a filler to a tire tread, and thus to obtain high wear resistance and low rolling resistance, it is generally advisable for this filler to be present in the elastomeric matrix in a final form that is both as finely divided as possible and as uniformly distributed as possible. However, such conditions can be achieved only if this filler has a very good capacity, on the one hand, to be incorporated into the matrix during the mixing with the elastomer and to deagglomerate, and, on the other hand, to disperse uniformly in this matrix.

Since fuel savings and the need to protect the environment have become a priority, it has proved necessary to produce tires that have a reduced rolling resistance without adversely affecting their wear resistance.

This has been made possible in particular by virtue of the use, in the treads of these tires, of novel rubber compositions reinforced at least partially with inorganic fillers, in particular specific silicas of the highly dispersible type, that are capable of rivaling from the reinforcing standpoint a conventional tire-grade carbon black, while offering these compositions a lower hysteresis, which is synonymous with a lower rolling resistance for tires containing them, and also improved grip on wet, snow-covered or icy ground.

However, for reciprocal affinity reasons, these inorganic filler particles have an annoying tendency to clump together in the elastomeric matrix. These interactions have the deleterious consequence of limiting the dispersion of the filler and therefore the reinforcing properties to a level substantially below that which it would be theoretically possible to achieve if all the (inorganic filler/elastomer) bonds capable of being created during the compounding operation were actually obtained. These interactions moreover tend to increase the viscosity in the uncured state of the rubber compositions and therefore to make them more difficult to process than when carbon black is present, even for highly dispersible silicas.

There are various methods for obtaining a masterbatch of diene elastomer and reinforcing filler. In particular, one type of solution consists, in order to improve the dispersiblity of the filler in the elastomeric matrix, in compounding the elastomer and the filler in the "liquid" phase. To do so, the process involves an elastomer in latex form, which is in the form of water-dispersed elastomer particles, and an aqueous dispersion of the filler, that is to say a filler dispersed in water, commonly referred to as a "slurry". Certain processes in particular, such as those described in document U.S. Pat. No. 6,048,923, make it possible to obtain a masterbatch of elastomer and filler that has a very good dispersion of the filler in the elastomeric matrix, greatly improved compared to the dispersion of the filler in the elastomeric matrix capable of being obtained during the solid-phase compounding of elastomer and reinforcing filler. This process consists in particular in incorporating a continuous flow of a first fluid consisting of an elastomer latex into the compounding zone of a coagulation reactor, in incorporating a second continuous flow of a second fluid consisting of an aqueous dispersion of filler under pressure into the compounding zone to form a mixture with the elastomer latex, the compounding of these two fluids being sufficiently energetic to make it possible to almost completely coagulate the elastomer latex with the filler before the outlet orifice of the coagulation reactor, and then in drying the coagulum obtained.

This process is particularly suitable for producing a masterbatch that has a very good dispersion, starting from a natural rubber latex and carbon black. Indeed, the application of this process is rendered particularly favourable by the ability that the natural rubber latex and carbon black have to coagulate together spontaneously. Conversely, silica does not coagulate spontaneously with the natural rubber latex since the silica aggregates are typically hydrophilic in nature and have greater affinity with water than with the elastomer particles themselves.

Furthermore, such a process has a limit as regards the content of carbon black present in the masterbatch, however the subsequent incorporation of carbon black in solid form, to increase the overall filler content in the elastomeric matrix, does not make it possible to retain the properties of very good dispersion of the filler in the elastomeric matrix that were obtained previously, and consequently does not make it possible to retain the advantages obtained for the hysteresis.

SUMMARY

The applicant has surprisingly discovered that, contrary to the effect of the addition of carbon black in solid form and contrary to the knowledge of those skilled in the art regarding the difficulties in dispersing and processing silica in an elastomeric matrix, the incorporation of silica into a diene elastomer and carbon black masterbatch that has a very good dispersion of the carbon black in the diene elastomer matrix, especially masterbatches prepared according to the aforementioned process, made it possible to obtain, after introduction of silica in solid form, novel masterbatches having improved hysteresis while retaining a very good dispersion of all of the filler in the elastomeric matrix.

One subject of the invention is thus a rubber composition based on at least one diene elastomer, a filler comprising at least carbon black and an inorganic filler with an inorganic filler content of less than or equal to 50 parts by weight per hundred parts of elastomer, phr, and also a crosslinking system, characterized in that the dispersion of the filler in the elastomeric matrix has a Z value of greater than or equal to 80.

Preferably, this composition is obtained from a first masterbatch comprising at least the diene elastomer and the carbon black, and having a dispersion of the carbon black in the elastomeric matrix that has a Z value of greater than or equal to 90, and more preferably still this masterbatch is obtained by liquid-phase compounding starting from a diene elastomer latex and an aqueous dispersion of carbon black.

According to one advantageous embodiment, such a first masterbatch is obtained according to the following process steps:
- feeding a continuous flow of a diene elastomer latex to a mixing zone of a coagulation reactor defining an elongate coagulation zone extending between the mixing zone and an outlet,
- feeding a continuous flow of a fluid comprising a filler under pressure to the mixing zone of a coagulation reactor to form a coagulated mixture,
- drying the coagulum obtained above in order to recover the first masterbatch.

According to one preferred embodiment, the diene elastomer of the composition is selected from the group consisting of polybutadienes, natural rubber, synthetic polyisoprenes, butadiene copolymers, isoprene copolymers and blends of these elastomers, and more preferably still the diene elastomer is a natural rubber.

According to another preferred embodiment, the inorganic filler of the composition is a silica or a silica-covered carbon black.

Another subject of the invention is a process for preparing a composition comprising at least one diene elastomer and a filler comprising at least one carbon black and an inorganic filler with an inorganic filler content of less than or equal to 50 parts by weight per hundred parts of elastomer, and also a crosslinking system, which comprises the following steps:
- preparing a first masterbatch comprising the diene elastomer and the carbon black, this first masterbatch having a dispersion of the filler in the elastomeric matrix that has a Z value of greater than or equal to 90,
- incorporating the inorganic filler, and the other constituents of the composition, with the exception of the crosslinking system, into the first masterbatch in a mixer by thermomechanically kneading everything until a maximum temperature of between 130° C. and 200° C. is reached,
- cooling the combined mixture to a temperature below 100° C.,
- subsequently incorporating: the crosslinking system,
- kneading everything up to a maximum temperature below 120° C.

Advantageously, the masterbatch is produced in the liquid phase from at least one elastomer latex and a dispersion of carbon black and more advantageously still the masterbatch is produced according to the following successive steps:
- feeding a continuous flow of a diene elastomer latex to a mixing zone of a coagulation reactor defining an elongate coagulation zone extending between the mixing zone and an outlet orifice,
- feeding a continuous flow of a fluid comprising a filler under pressure to the mixing zone of a coagulation reactor to form a coagulated mixture,
- drying the coagulum obtained above in order to recover the first masterbatch.

According to one preferred embodiment of the process, the diene elastomer is a natural rubber and the inorganic filler is a silica, preferably a precipitated silica, or a silica-covered carbon black.

The invention also relates to a process for preparing a rubber composition based on at least one diene elastomer, a filler comprising at least carbon black and an inorganic filler with an inorganic filler content of less than or equal to 50 parts by weight per hundred parts of elastomer, and also a crosslinking system, characterized in that it comprises the following phases:
- preparation of a first masterbatch of diene elastomer and of carbon black, produced according to the following steps:
  - feeding a continuous flow of a diene elastomer latex to a mixing zone of a coagulation reactor defining an elongate coagulation zone extending between the mixing zone and an outlet,
  - feeding a continuous flow of a fluid comprising a filler under pressure to the mixing zone of a coagulation reactor to form a coagulated mixture,
  - drying the coagulum obtained above in order to recover the first masterbatch,
- incorporating the inorganic filler, and the other constituents of the composition, with the exception of the crosslinking system, into the first masterbatch obtained above, in a mixer by thermomechanically kneading everything until a maximum temperature of between 130° C. and 200° C. is reached,
- cooling the combined mixture to a temperature below 100° C.,
- subsequently incorporating: the crosslinking system,
- kneading everything up to a maximum temperature below 120° C.

The invention also relates to a masterbatch of diene elastomer and of filler which comprises at least one diene elastomer and a filler comprising at least carbon black and an inorganic filler with an inorganic filler content of less than or equal to 50 parts by weight per hundred parts of elastomer, characterized in that the dispersion of the filler in the elastomeric matrix has a Z value of greater than or equal to 80, and in particular obtained by addition of the inorganic filler to a first masterbatch comprising at least the diene elastomer and the carbon black, and having a dispersion of the carbon black in the elastomeric matrix that has a Z value of greater than or equal to 90.

Preferably, the first masterbatch is obtained by liquid-phase compounding starting from a diene elastomer latex and an aqueous dispersion of carbon black, and more preferably still it is obtained according to the following process steps:
- feeding a continuous flow of a diene elastomer latex to a mixing zone of a coagulation reactor defining an elongate coagulation zone extending between the mixing zone and an outlet,
- feeding a continuous flow of a fluid comprising a filler under pressure to the mixing zone of a coagulation reactor to form a coagulated mixture,
- drying the coagulum obtained above in order to recover the first masterbatch.

The invention also relates to a process for preparing a masterbatch which comprises at least one diene elastomer, a filler comprising at least carbon black and an inorganic filler with an inorganic filler content of less than or equal to 50 parts by weight per hundred parts of elastomer, obtained by addition of the inorganic filler to a first diene elastomer and carbon black masterbatch produced according to the following steps:

feeding a continuous flow of a diene elastomer latex to a mixing zone of a coagulation reactor defining an elongate coagulation zone extending between the mixing zone and an outlet, feeding a continuous flow of a fluid comprising a filler under pressure to the mixing zone of a coagulation reactor to form a coagulated mixture, drying the coagulum obtained above in order to recover the first masterbatch, and also to the masterbatch obtained by this process.

A final subject of the invention is a finished or semi-finished article, a tire tread, a tire or a semi-finished product comprising a composition as described previously or a masterbatch as described previously.

DETAILED DESCRIPTION OF SPECIFIC EMBODIMENTS

I.—Measurements and Tests

The rubber compositions are characterized, before and after curing, as indicated below.

Mooney Plasticity

Use is made of an oscillating consistometer as described in the French standard NF T 43-005 (1991). The Mooney plasticity measurement is carried out according to the following principle: the composition in the uncured state (i.e. before curing) is moulded in a cylindrical chamber heated to 100° C. After preheating for one minute, the (small-sized) rotor rotates within the test specimen at 2 rpm and the working torque for maintaining this movement is measured after rotating for 4 minutes. The Mooney plasticity (MS 1+4) is expressed in "Mooney units" (MU, with 1 MU=0.83 Newton·meter).

Dispersion

As is known, the dispersion of filler in an elastomeric matrix can be represented by the Z value, which is measured, after crosslinking, according to the method described by S. Otto et al. in Kautschuk Gummi Kunststoffe, 58th edition, NR 7-8/2005, in agreement with the standard ISO 11345.

The calculation of the Z value is based on the percentage of surface area in which the filler is not dispersed ("% undispersed surface area"), as measured by the "disperGRADER+" machine provided with its operating process and its "disperDATA" operating software by Dynisco, according to the equation:

$$Z=100-(\% \text{ undispersed surface area})/0.35$$

The percentage of undispersed surface area is, itself, measured by a camera that observes the surface area of the sample under incident light at 30°. The light points are associated with the filler and agglomerates, whilst the dark points are associated with the rubber matrix; digital processing converts the image into a black and white image, and enables the determination of the percentage of undispersed surface area, as described by S. Otto in the aforementioned document.

The higher the Z value, the better the dispersion of the filler in the elastomeric matrix (a Z value of 100 corresponding to a perfect dispersion and a Z value of 0 to a mediocre dispersion). A Z value greater than or equal to 80 will be considered to correspond to a surface area having a very good dispersion of the filler in the elastomeric matrix.

Tensile Tests

These tensile tests make it possible to determine the elasticity stresses and the properties at break. Unless otherwise indicated, they are carried out in accordance with the French Standard NF T 46-002 of September 1988. At second elongation (i.e. after an accommodation cycle at the extension rate provided for the measurement itself) the nominal secant modulus (or apparent stress, in MPa) is measured at 100% elongation (denoted by MA100). The tensile measurements for determining the secant accommodated moduli are carried out at a temperature of 23° C.±2° C. and under standard hygrometry conditions (50±5% relative humidity).

The stresses at break (in MPa) and elongations at break (in %) are also measured. All these tensile measurements are carried out at a temperature of 60° C.±2° C., and under standard hygrometry conditions (50±5% relative humidity), according to the French standard NF T 40-101 (December 1979).

Tearability

The tearability indices are measured at 100° C. In particular, the force to be exerted in order to obtain the break (FRD, in MPa) is determined and the strain at break (DRD, in %) is measured on a test specimen with dimensions of 10×105×2.5 mm that is notched in the centre of its length to a depth of 5 mm in order to give rise to the break of the test specimen.

Dynamic Properties

The dynamic properties and in particular $\tan(\delta)_{max}$, representative of the hysteresis, are measured on a viscosity analyser (Metravib VA4000), according to the standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded under standard temperature conditions (23° C.) according to the standard ASTM D 1349-99, or, depending on the case, at a different temperature; in particular in the examples cited, the measurement temperature is 60° C. A peak-to-peak strain amplitude sweep is carried out from 0.1% to 50% (forward cycle) and then from 50% to 0.1% (return cycle). The results made use of are the complex dynamic shear modulus (G*) and the loss factor $\tan(\delta)$. For the return cycle, the maximum value of $\tan(\delta)$ observed, denoted by $\tan(\delta)_{max}$, is indicated.

II. Detailed Description of the Invention

The invention relates to a composition based on a masterbatch of diene elastomer and of reinforcing filler which comprises at least one diene elastomer and a filler comprising at least carbon black and an inorganic filler with an inorganic filler content of less than or equal to 50 parts by weight per hundred parts of elastomer, and that has a dispersion of the filler in the elastomeric matrix that has a Z value of greater than or equal to 80, and more preferably a Z value of greater than or equal to 90.

According to one embodiment of the invention, this composition is obtained by addition of inorganic filler to a first masterbatch comprising at least the diene elastomer and the carbon black, and having a dispersion of the carbon black in the elastomeric matrix that has a Z value of greater than or equal to 90.

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

II-1) Diene Elastomer

As is customary, the terms "elastomer" and "rubber", which are interchangeable, are used without distinction in the text.

A "diene" elastomer or rubber should be understood, in a known manner, to mean an elastomer resulting at least in part (i.e., a homopolymer or a copolymer) from diene monomers (monomers bearing two carbon-carbon double bonds which may or may not be conjugated).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Among these diene elastomers, natural rubber and synthetic elastomers are furthermore distinguished.

By synthetic diene elastomers capable of being used in accordance with the invention, the expression "diene elastomer" is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with an unconjugated diene monomer having from 6 to 12 carbon atoms, such as, for example, the elastomers obtained from ethylene and propylene with an unconjugated diene monomer of the aforementioned type, such as, in particular, 1,4-hexadiene, ethylidene norbornene or dicyclopentadiene; and (d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the commercial "vinyl-toluene" mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure, which depends on the polymerization conditions used, in particular on the presence or absence of a modifying and/or randomizing agent, and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalization agent. Mention may be made for example, for coupling to carbon black, of functional groups comprising a C—Sn bond or aminated functional groups, such as aminobenzophenone for example; mention may be made for example, for coupling to an inorganic filler such as silica, of silanol or polysiloxane functional groups having a silanol end (such as described for example in FR 2 740 778 or U.S. Pat. No. 6,013,718, and WO 2008/141702), alkoxysilane groups (such as described for example in FR 2 765 882 or U.S. Pat. No. 5,977,238), carboxylic groups (such as described for example in WO 01/92402 or U.S. Pat. No. 6,815,473, WO 2004/096865 or US 2006/0089445) or else polyether groups (such as described for example in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature, Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2- plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To summarize, the synthetic diene elastomer or elastomers according to the invention are preferably selected from the group of highly unsaturated diene elastomers formed by polybutadienes (abbreviated to "BR"), synthetic polyisoprenes (IR), butadiene copolymers, isoprene copolymers, and blends of these elastomers. Such copolymers are more preferably selected from the group consisting of butadiene/styrene copolymers (SBR), isoprene/butadiene copolymers (BM), isoprene/styrene copolymers (SIR) and isoprene/butadiene/styrene copolymers (SBIR).

As was specified above, liquid-phase compounding processes are preferably used to make it possible to obtain masterbatches based on diene elastomer and on carbon black that have a very good dispersion of the carbon black in the elastomer. Thus, especially for the production of the first masterbatch of diene elastomer and carbon black, use will more particularly be made of a diene elastomer latex, the diene elastomer latex being a particular form of the elastomer that is in the form of water-dispersed elastomer particles.

The invention therefore preferably relates to latices of diene elastomers, the diene elastomers being those defined above.

More particularly, for natural rubber (NR) which is particularly suitable for the invention, this natural rubber exists in various forms as explained in detail in Chapter 3 "Latex concentrates: properties and composition" by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latices referred to as "field latices", the natural rubber latices referred to as "concentrated natural rubber latices", epoxidized latices (ENR), deproteinized latices or else prevulcanized latices. The natural rubber field latex is a latex in which ammonia has been added to prevent premature coagulation and the concentrated natural rubber latex corresponds to a field latex that has undergone a treatment corresponding to a washing followed by a further concentration. The various categories of concentrated natural rubber latices are listed in particular according to the standard ASTM D 1076-06. Distinguished in particular from among these concentrated natural rubber latices are the concentrated natural rubber latices of quality referred to as: "HA" (high ammonia) and of quality referred to as "LA"; for the invention, use will advantageously be made of concentrated natural rubber latices of HA quality.

The NR latex may be physically or chemically modified beforehand (centrifugation, enzyme treatment, chemical modifier, etc.).

The latex may be used directly or may be first diluted in water to facilitate the processing thereof.

Thus, as synthetic elastomer latex, the latex may in particular consist of a synthetic diene elastomer already available in the form of an emulsion (for example a butadiene/styrene copolymer, SBR, prepared in emulsion), or of a synthetic diene elastomer initially in solution (for example an SBR prepared in solution) which is emulsified in a mixture of organic solvent and water, generally by means of a surfactant.

An SBR latex, especially an SBR prepared in emulsion ("ESBR") or an SBR prepared in solution ("SSBR"), and more particularly an SBR prepared in emulsion, is particularly suitable for the invention.

There are two main types of processes for the copolymerization, in emulsion, of styrene and butadiene, one of them, or the hot process (carried out at a temperature close to 50° C.), being suitable for the preparation of highly branched SBRs whereas the other, or the cold process (carried out at a temperature which may range from 15° C. to 40° C.), makes it possible to obtain more linear SBRs.

For a detailed description of the effectiveness of several emulsifiers that can be used in said hot process (as a function of the contents of said emulsifiers), reference may for example be made to the two articles by C. W. Carr, I. M. Kolthoff, E. J. Meehan, University of Minnesota, Minneapolis, Minn., which appeared in the Journal of Polymer Science of 1950, Vol. V, No. 2, pp. 201-206, and of 1951, Vol. VI, No. 1, pp. 73-81.

Regarding comparative examples of the implementation of said cold process, reference may for example be made to the article 1/2 Industrial and Engineering Chemistry, 1948, Vol. 40, No. 5, pp. 932-937, E. J. Vandenberg, G. E. Hulse, Hercules Powder Company, Wilmington, Del.+ and to the article ½ Industrial and Engineering Chemistry, 1954, Vol. 46, No. 5, pp. 1065-1073, J. R. Miller, H. E. Diem, B. F. Goodrich Chemical Co., Akron, Ohio+.

In the case of an SBR elastomer (ESBR or SSBR), use is especially made of an SBR having an average styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR may advantageously be used as a blend with a BR that preferably has more than 90% (mol %) of cis-1,4-bonds.

It will be noted that it is possible to envisage using one or more natural rubber latices as a blend, one or more synthetic rubber latices as a blend, or a blend of one or more natural rubber latices with one or more synthetic rubber latices.

II-2) Fillers

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N400, N660, N683, N772 or N990).

Also suitable as carbon black are the carbon blacks partially or completely covered with silica via a post-treatment, or the carbon blacks modified in situ by silica such as, non-limitingly, the fillers sold by Cabot Corporation under the name Ecoblack™ "CRX 2000" or "CRX4000".

The expression "inorganic filler" should be understood here, in a known manner, to mean any inorganic or mineral filler, whatever its colour and its origin (natural or synthetic), also referred to as "white filler", "clear filler" or even "non-black filler", in contrast to carbon black, this inorganic filler being capable of reinforcing by itself alone, without means other than an intermediate coupling agent, a rubber composition intended for the manufacture of a tread for tires, in other words capable of replacing, in its reinforcing role, a conventional tire-grade carbon black for a tread. Such a filler is generally characterized by the presence of functional groups, in particular hydroxyl (—OH) groups, at its surface, requiring, in order to be used as a reinforcing filler, the use of a coupling agent or system intended to provide a stable chemical bond between the isoprene elastomer and said filler.

Such an inorganic filler may therefore be used with a coupling agent in order to enable the reinforcement of the rubber composition in which it is included. It may also be used with a covering agent (which does not provide a bond between the filler and the elastomeric matrix) in addition to a coupling agent or not (in this case the inorganic filler does not play a reinforcing role).

The physical state in which the inorganic filler is present is not important, whether it is in the form of a powder, of microbeads, of granules, of balls or any other appropriate densified form. Of course, the expression "inorganic filler" is also understood to mean mixtures of various inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable especially as inorganic fillers. The silica used may be any silica known to those skilled in the art, especially any precipitated or pyrogenic silica having a BET surface area and a CTAB specific surface area that are both less than 450 m2/g, preferably ranging from 30 to 400 m²/g. Mention will be made, as highly dispersible precipitated silicas ("HDSs"), for example, of the Ultrasil 7000 and Ultrasil 7005 silicas from Evonik, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in application WO 03/16837.

When the compositions of the invention are intended for tire treads having a low rolling resistance, the inorganic filler used, in particular if it is silica, preferably has a BET surface area of between 45 and 400 m²/g, more preferably of between 60 and 300 m²/g.

Preferably, the inorganic fillers for which the mean size (by weight) is between 20 and 300 nm, more preferably between 20 and 150 nm, are particularly suitable for the present invention. This mean size is conventionally measured after dispersion, by ultrasonic deagglomeration, of the filler to be analysed in water or an aqueous solution containing a surfactant. For an inorganic filler such as silica, the measurement is carried out using an X-ray detection centrifugal sedimentometer of "XDC" ("X-ray disc centrifuge") type, sold by Brookhaven Instruments, according to the following procedure. A suspension of 3.2 g of sample of inorganic filler to be analysed in 40 ml of water is produced by the action over 8 minutes, at 60% power (60% of the maximum position of the "output control"), of a 1500 W ultrasonic probe (¾ inch Vibracell sonicator sold by Bioblock); after sonication, 15 ml of the suspension are introduced into the disc rotating at a speed that varies between 3000 and 6000 rpm (the speed being adapted as a function of the mean size of the filler: the smaller the size, the higher the speed); after sedimentation for 120 minutes, the weight distribution of the particle sizes and the mean size, by weight, of the particles dw are calculated by the software of the "XDC" sedimentometer (dw=Σ(ni di5)/Σ(ni di4) with ni being the number of objects of the size class or diameter di).

Preferably, the content of total filler (carbon black and inorganic filler such as silica) is between 20 and 200 phr, more preferably between 30 and 150 phr and more preferably still between 30 and 100 phr, the optimum being, in a known manner, different depending on the particular applications targeted: the level of reinforcement expected on a bicycle tire for example is, of course, less than that required on a tire capable of running at high speed in a sustained manner, for example a motorcycle tire, a tire for a passenger vehicle or for a utility vehicle such as a heavy duty vehicle.

According to one preferred embodiment of the invention, use is made of carbon black, the content of which varies from 30 to 80 phr, and an inorganic filler, in particular silica, the content of which varies from 5 to 50 phr, more particularly the total filler of the composition comprising carbon black, the content of which varies from 35 to 70 phr and an inorganic filler, in particular silica, the content of which varies from 5 to 35 phr, more preferably still the total filler comprising carbon black, the content of which varies from 40 to 65 phr and an inorganic filler, in particular silica, the content of which varies from 10 to 30 phr.

II-3) Masterbatches—Rubber Composition

Advantageously, the masterbatches and the compositions thus produced are capable of being used in tire applications.

The rubber compositions for tires based on masterbatches and inorganic filler according to the invention may also comprise, in a known manner, a coupling agent and/or a covering agent and a vulcanization system.

Use is made, in a known manner, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their specific structure, such as described, for example, in applications WO 03/002648 (or US 2005/016651) and WO 03/002649 (or US 2005/016650).

Suitable in particular, without the definition below being limiting, are silane polysulphides, referred to as "symmetrical", corresponding to the following general formula (III):

Z-A-S$_x$-A-Z, in which: (III)

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$, especially $C_1$-$C_4$, alkylenes, in particular propylene);

Z corresponds to one of the formulae below:

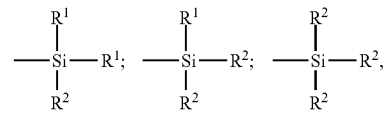

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the $R^2$, radicals, which are substituted or unsubstituted and identical to or different from one another, represent a $C_1$-$C_{18}$ alkoxy or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (III), in particular the standard commercially available mixtures, the mean value of the "x" subscripts is a fractional number preferably between 2 and 5, more preferably close to 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxydi($C_1$-$C_4$)alkylsilylpropyl) polysulphides (in particular disulphides, trisulphides or tetrasulphides), more particularly bis(monoethoxydimethylsilylpropyl) tetrasulphide, such as described in the patent application WO 02/083782 (or US 2004/132880).

Mention will in particular be made, as coupling agents other than an alkoxysilane polysulphide, of bifunctional POSs (polyorganosiloxanes) or else of hydroxysilane polysulphides ($R^2$=OH in the above formula III), such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

As covering agents, processing aids will generally be considered that are capable, in a known manner, owing to an improvement in the dispersion of the inorganic filler in the rubber matrix and a lowering of the viscosity of the compositions, of improving their ability to process in the uncured state, these processing aids being for example hydrolysable silanes, such as alkylalkoxysilanes (especially alkyltriethoxysilanes), polyols, polyethers (for example polyethylene glycols), primary, secondary or tertiary amines (for example trialkanolamines), hydroxylated or hydrolysable POSs, for example α,ω-dihydroxy-polyorganosiloxanes (especially α,ω-dihydroxy-polydimethylsiloxanes), and fatty acids such as, for example, stearic acid.

In the rubber compositions in accordance with the invention, the content of coupling agent is preferably between 0.1% and 12% by weight of the inorganic filler for a CTAB surface area of 160 $m^2/g$, more preferably between 4% and 10% by weight of the inorganic filler for a CTAB surface area of 160 $m^2/g$; and/or the content of covering agent is preferably between 0.1% and 20% by weight of the inorganic filler for a CTAB surface area of 160 $m^2/g$, more preferably between 5% and 20% by weight of the inorganic filler for a CTAB surface area of 160 $m^2/g$. It is possible for the content of coupling agent to be adjusted to the specific surface area of the filler.

A person skilled in the art will understand that a filler of another nature, in particular organic nature, might be used as filler equivalent to the inorganic filler described in the present section, provided that this filler is covered with an inorganic layer, such as silica, or else comprises, at its surface, functional sites, in particular hydroxyls, requiring the use of a coupling agent in order to form the connection between the filler and the elastomer.

These rubber compositions in accordance with the invention may also comprise all or some of the standard additives customarily used in elastomer compositions intended for the manufacture of tires, in particular treads, such as for example plasticizers or extender oils, whether the latter are of aromatic or non-aromatic nature, pigments, protective agents such as antiozone waxes, chemical antiozonants, antioxidants, anti-fatigue agents, reinforcing resins, methylene acceptors (for example phenolic-novolac resin) or methylene donors (for example HMT or H3M) as described, for example, in application WO 02/10269, a crosslinking system based on either sulphur or on sulphur donors, and/or on a peroxide and/or on bismaleimides, and vulcanization accelerators.

Preferably, these compositions comprise, as preferred non-aromatic or very weakly aromatic plasticizing agent, at least one compound selected from the group consisting of naphthenic oils, paraffinic oils, MES oils, TDAE oils, glycerol esters (in particular trioleates), hydrocarbon-based plasticizing resins exhibiting a high Tg preferably above 30° C., and mixtures of such compounds.

It should be noted that it is also possible to envisage producing masterbatches in accordance with the invention by incorporating therein, especially before the drying phase of the production of the masterbatch in the liquid phase, additives as described above—oil, antioxidant, coupling agent, covering agent, etc.

II-4). Manufacture of Rubber Compositions and Masterbatches

The rubber compositions of the invention are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

According to one preferred embodiment of the invention, all the base constituents of the compositions of the invention, with the exception of the vulcanization system, in particular the masterbatch comprising the carbon black and the inorganic filler, and the coupling agent where appropriate, are incorporated intimately, by kneading, into the diene elastomer during the so-called non-productive first phase, that is to say at least these various base constituents are introduced into the mixer and thermomechanically kneaded, in one or more steps, until the maximum temperature of between 130° C. and 200° C., preferably between 145° C. and 185° C., is reached.

According to one preferred embodiment of the invention, the inorganic filler is incorporated into the diene elastomer and the carbon black which have been previously prepared in the form of a first masterbatch.

Preferably, this first masterbatch is produced in the "liquid" phase. To do so, the process involves a diene elastomer in latex form, which is in the form of water-dispersed elastomer particles, and an aqueous dispersion of the carbon black, that is to say a filler dispersed in water, commonly referred to as a "slurry". More preferably still, the process steps described in document U.S. Pat. No. 6,048,923 will be followed, which process consists in particular in incorporating a continuous flow of a first fluid consisting of the elastomer latex into the compounding zone of a coagulation reactor, in incorporating a second continuous flow of a second fluid consisting of the aqueous dispersion of carbon black under pressure into the compounding zone to form a mixture with the elastomer latex, the compounding of these two fluids being sufficiently energetic to make it possible to almost completely coagulate the elastomer latex with the carbon black before the outlet orifice of the coagulation reactor, and then in drying the coagulum obtained.

It will be noted in particular that the incorporation of the inorganic filler may be carried out at the same time as the introduction into the mixer of the other constituents (especially the diene elastomer alone or in the form of a first masterbatch) but also advantageously that this incorporation may be offset in time by a few tens of seconds to a few minutes.

By way of example, the (non-productive) first phase is carried out in a single thermomechanical stage during which all the necessary constituents (where appropriate in the form of a masterbatch as specified above), the optional complementary covering agents or processing aids and various other additives, with the exception of the vulcanization system, are introduced into an appropriate mixer, such as a standard internal mixer. The total duration of the kneading, in this non-productive phase, is preferably between 1 and 15 min. After cooling of the mixture thus obtained during the non-productive first phase, the vulcanization system is then incorporated at low temperature, generally in an external mixer such as an open mill; everything is then mixed (productive phase) for a few minutes, for example between 2 and 15 min.

The crosslinking system is preferably a vulcanization system, i.e. a system based on sulphur (or on a sulphur donor) and on a primary vulcanization accelerator. Added to this base vulcanization system are various known secondary vulcanization accelerators or vulcanization activators, such as zinc oxide, stearic acid or equivalent compounds, or guanidine derivatives (in particular diphenylguanidine), incorporated during the non-productive first phase and/or during the productive phase, as described subsequently.

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazyl sulphenamide ("CBS"), N,N-dicyclohexyl-2-benzothiazyl sulphenamide ("DCBS"), N-(tert-butyl)-2-benzothiazyl sulphenamide ("TBBS"), N-(tert-butyl)-2-benzothiazyl sulphenimide ("TBSI"), zinc dibenzyldithiocarbamate ("ZBEC") and the mixtures of these compounds.

The final composition thus obtained is then calendered, for example in the form of a sheet or slab, especially for laboratory characterization, or else extruded in the form of a rubber profiled element that can be used for example as a tire tread for a passenger vehicle, heavy vehicle, etc.

III Exemplary Embodiments of the Invention

III. 1 Preparation of Masterbatch of Natural Rubber and Carbon Black

The first masterbatches of diene elastomer and carbon black, having a dispersion value of the filler in the elastomeric matrix of greater than or equal to 90, are produced in the liquid phase according to the process described in U.S. Pat. No. 6,048,923.

Thus, a masterbatch is prepared, according to the protocol explained in detail in the aforementioned patent, from carbon black N234 sold by Cabot Corporation, and natural rubber field latex originating from Malaysia and having a rubber solids content of 28% and an ammonia content of 0.3%.

Thus a masterbatch A of natural rubber and carbon black N234 is obtained in which the content of carbon black is 50 phr and which has a dispersion of the black in the natural rubber matrix that has a Z value of 90.

III-2 Preparation of the Rubber Compositions

The control compositions TM are produced according to a conventional process of compounding in solid form in which the elastomer, therefore natural rubber in these examples, and the reinforcing filler, including the carbon black N234 sold by Cabot Corporation and, where appropriate, the precipitated silica Ultrasil 7000 sold by Evonik, are introduced in solid form.

The control rubber compositions TA not in accordance with the invention are produced from the masterbatch A, to which is added, according to a conventional process of compounding in solid form, carbon black N234 sold by Cabot Corporation.

The rubber compositions CA in accordance with the invention are produced from the first masterbatch A, to which is added, according to a conventional process of compounding in solid form (powder or granules), precipitated silica Ultrasil 7000 sold by Evonik.

The various compositions are produced in the following manner:

The tests below are carried out in the following manner: introduced into an internal mixer, filled to 70%, and the initial vessel temperature of which is around 90° C., are the first masterbatch A for the compositions TA and CA (or the natural rubber in solid form and the N234 carbon black for the compositions TM), a second filler, a coupling agent and/or a covering agent where appropriate, followed, after kneading for one to two minutes, by the various other additives, with the exception of the vulcanization system. Thermomechanical working (non-productive phase) is then carried out in one step (total duration of the kneading equal to around 5 min), until a maximum "dropping" temperature of around 165° C. is reached.

The mixture thus obtained is recovered and cooled and then the vulcanization system (sulphur and sulphenamide accelerator) is added in an external mixer (homofinisher) at 70° C., by compounding everything (productive phase) for around 5 to 6 min. When a covering agent is present, this covering agent may also be introduced into the external mixer instead of being introduced into the internal mixer.

The compositions thus obtained are then calendered either in the form of slabs (thickness of 2 to 3 mm) or thin sheets of rubber for the measurement of their physical or mechanical properties, or in the form of profiled elements that can be used directly, after cutting and/or assembly to/at the desired dimensions, for example as semi-finished products for tires, in particular as tire treads.

III-3 Example

The purpose of this example is to demonstrate the properties of a rubber composition in accordance with the invention, which properties are improved relative to control compositions that are not in accordance with the invention due to the nature of their reinforcing filler or their preparation process.

The rubber compositions TM1 to TM4 are prepared "in bulk" from natural rubber and carbon black and, where appropriate, silica, in solid form as described in detail in section III-2. The control compositions TA1 and TA2 and the compositions in accordance with the invention CA3 and CA4 are respectively prepared from a first masterbatch A, to which a second filler is added according to the process described in detail in section III-2.

All of the compositions, irrespective of the manufacturing process, have the following base formulation (in phr):

| | |
|---|---|
| Natural rubber | 100 |
| 6PPD (a) | 1.5 |
| Plasticizer (b) | 1 |
| Stearic acid | 2 |
| Zinc oxide (c) | 3 |

-continued

| | |
|---|---|
| Accelerator (d) | 1.1 |
| Sulphur | 1.1 |

(a) N-1,3-dimethylbutyl-N-phenyl-para-phenylenediamine ("Santoflex 6-PPD" from Flexsys);
(b) MES oil ("Catenex SNR" from Shell);
(c) zinc oxide (industrial grade - Umicore);
(d) N-cyclohexyl-2-benzothiazyl sulphenamide ("Santocure CBS" from Flexsys).

In addition to these constituents, the compositions TM1 to TM4; TA1, TA2, CA3 and CA4 differ from one another due to the nature and the content (in phr) of second reinforcing filler that they include, given in detail in Table 1 below.

TABLE 1

| Composition | TM1 | TM2 | TM3 | TM4 | TA1 | TA2 | CA3 | CA4 |
|---|---|---|---|---|---|---|---|---|
| N234 (1) | — | — | — | — | 50 | 50 | 50 | 50 |
| N234 (2) | 57 | 65 | 50 | 50 | 7 | 15 | — | — |
| Silica | — | — | 7 | 15 | — | — | 7 | 15 |
| Silane (3) | — | — | 0.7 | 1.5 | — | — | 0.7 | 1.5 |

(1) carbon black originating from masterbatch A;
(2) carbon black added to the NR or to the masterbatch A by standard compounding in solid form;
(3) TESPT ("SI69" from Evonik).

The properties measured before and after curing at 150° C. for 40 minutes are given in Table 2 below.

TABLE 2

| Composition | TM1 | TM2 | TM3 | TM4 | TA1 | TA2 | CA3 | CA4 |
|---|---|---|---|---|---|---|---|---|
| Properties before curing | | | | | | | | |
| Mooney | 61 | 76 | 60 | 73 | 50 | 61 | 45 | 56 |
| Properties after curing | | | | | | | | |
| Z value | 83 | 87 | 75 | 66 | 93 | 93 | 94 | 94 |
| MA100 | 2.4 | 2.9 | 2.3 | 2.3 | 2.4 | 3.0 | 2.2 | 2.3 |
| MA300/MA100 | 1.29 | 1.28 | 1.24 | 1.22 | 1.39 | 1.33 | 1.39 | 1.30 |
| Strain at break | 537 | 479 | 563 | 539 | 512 | 506 | 552 | 540 |
| Stress at break | 25.9 | 24.4 | 25.7 | 24.7 | 25.1 | 25.9 | 25.6 | 24.6 |
| DRD | 278 | 206 | 324 | 256 | 261 | 193 | 356 | 276 |
| Tan(δ)max | 0.213 | 0.233 | 0.184 | 0.201 | 0.208 | 0.255 | 0.164 | 0.190 |

Comparison of control compositions TM1 and TM2 containing only carbon black (57 and 65 phr respectively) with compositions TM3 and TM4 containing 50 phr of black and silica (7 and 15 phr respectively) makes it possible to observe that the introduction of silica enables an expected improvement in the hysteresis (drop in tan(δ)max) but at the expense of a significant degradation in the dispersion of the reinforcing filler (Z value).

For compositions CA3 and CA4 produced from the masterbatch A having a very good dispersion, in accordance with the invention, and compared respectively to compositions TM3 and TM4, it is observed that the addition of silica to the masterbatch makes it possible to lower the hysteresis and, surprisingly, to retain a very good dispersion in a manner identical to that obtained with the masterbatch A, and without degradation of the other properties. A significant improvement in the tearability (increased value of DRD) and a reduction in the hysteresis (6% to 12%) are also surprisingly observed for compositions CA3 and CA4 in accordance with the invention compared respectively, to compositions TM3 and TM4, contrary to that which is observed with the addition of carbon black to the masterbatch by comparing compositions TA1 and TA2 respectively with compositions TM1 and TM2. These comparisons are demonstrated in Table 3 below, which shows, for the tearability and the hysteresis, the gain obtained as a pourcentage (it being understood that a positive percentage represents an improvement in these properties, i.e. an increase of the tearability and a reduction in the hysteresis) for compositions having an identical formulation (especially same fillers and same content of these fillers) but the preparation method of which [lacuna], which makes it possible to demonstrate the synergy linked to the quality of the dispersion and the nature of the filler added.

TABLE 3

| | Compositions compared | | | |
|---|---|---|---|---|
| | CA3 vs TM3 | CA4 vs TM4 | TA1 vs TM1 | TA2 vs TM2 |
| Gain in tearability (%) | 10 | 8 | −6 | −6 |
| Gain in hysteresis (%) | 12 | 6 | −3 | −9 |

The invention claimed is:

1. A process for preparing a rubber composition based on at least one diene elastomer, a filler comprising at least carbon black and an inorganic filler with an inorganic filler content of less than or equal to 50 parts by weight per hundred parts of elastomer, and also a crosslinking system, comprising:
   preparing a first masterbatch of diene elastomer and of carbon black, comprising: feeding a continuous flow of a diene elastomer latex to a mixing zone of a coagulation reactor defining an elongate coagulation zone extending between the mixing zone and an outlet,
   feeding a continuous flow of a fluid comprising a filler comprising carbon black under pressure to the mixing zone of a coagulation reactor to form a coagulated mixture,
   drying the coagulum obtained above in order to recover the first masterbatch,
   incorporating the inorganic filler, and the other constituents of the composition, with the exception of a crosslinking system, into the first masterbatch obtained above, in a mixer by thermomechanically kneading everything until a maximum temperature of between 130° C. and 200° C. is reached,
   cooling the combined mixture to a temperature below 100° C.,
   subsequently incorporating: a crosslinking system, kneading everything up to a maximum temperature below 120° C.

2. The process according to claim 1, wherein the diene elastomer is selected from the group consisting of polybutadienes, natural rubber, synthetic polyisoprenes, butadiene copolymers, isoprene copolymers, and blends of these elastomers.

3. The process according to claim 2, wherein the diene elastomer is a natural rubber.

4. The process according to claim 1, wherein the inorganic filler is a silica or a silica covered carbon black.

5. The process according to claim 1, wherein the content of carbon black is between 30 and 80 phr, and the content of inorganic filler is between 5 and 50 phr.

6. A process for preparing a masterbatch which comprises at least one diene elastomer, a filler comprising at least carbon black and an inorganic filler and having an inorganic filler content of less than or equal to 50 parts by weight per hundred parts of elastomer, comprising adding the inorganic filler to a first diene elastomer and carbon black masterbatch wherein the first diene elastomer and carbon black masterbatch is produced according to the following steps:
- feeding a continuous flow of a diene elastomer latex to a mixing zone of a coagulation reactor defining an elongate coagulation zone extending between the mixing zone and an outlet,
- feeding a continuous flow of a fluid comprising a filler comprising carbon black under pressure to the mixing zone of a coagulation reactor to form a coagulated mixture,
- drying the coagulum obtained above in order to recover the first masterbatch.

7. The process according to claim 4, wherein the silica is a precipitated silica or a silica-covered carbon black.

8. The process according to claim 5, wherein the content of carbon black is between 40 and 70 phr and the content of inorganic filler is between 10 and 30 phr.

* * * * *